United States Patent [19]

Sartorio et al.

[11] 4,096,384

[45] Jun. 20, 1978

[54] POSITION TRANSDUCER FOR MACHINE TOOLS AND MEASURING MACHINES

[75] Inventors: Franco Sartorio, Turin; Giorgio Minucciani, Moncalieri (Turin); Francesco Germano, Turin, all of Italy

[73] Assignee: Dea Digital Electronic Automation S.p.A., Moncalieri, Turin, Italy

[21] Appl. No.: 782,476

[22] Filed: Mar. 29, 1977

[30] Foreign Application Priority Data

Apr. 2, 1976 Italy .................... 67764 A/76

[51] Int. Cl.² .................................. H01J 3/14
[52] U.S. Cl. ........................ 250/237 G; 356/169
[58] Field of Search ............ 340/347 P; 356/169, 356/170; 250/231 SE, 237 R, 237 G

[56] References Cited

U.S. PATENT DOCUMENTS

| 3,451,054 | 6/1969 | Johnson | 356/169 |
| 3,544,800 | 12/1970 | Elliott | 250/237 G |
| 3,867,038 | 2/1975 | Westell | 356/169 |

Primary Examiner—David C. Nelms
Attorney, Agent, or Firm—Ladas, Parry, Von Gehr, Goldsmith & Deschamps

[57] ABSTRACT

A position transducer for machine tools and measuring machines, arranged to measure relative displacements of a first part of the machine with respect to a second part of the machine, is described. The main feature of this position transducer is to operate by means of the optical coupling of at least two photoelectric readers fixed on the first part and at least two optical photoengraved rules rigidly connected to the second part. Selector means are provided to present in output the signals from one of the photoelectric readers.

11 Claims, 3 Drawing Figures

POSITION TRANSDUCER FOR MACHINE TOOLS AND MEASURING MACHINES

BACKGROUND OF THE INVENTION

This invention relates to a position transducer for machine tools and measuring machines, realized by means of optical coupling of photoelectric readers and photoengraved rules in a new and particular arrangement.

At the present time, in the measuring machines and machine tools in which it is necessary to know with the best precision the position of a movable part, as for example a carriage, with respect to fixed reference positions, pinion/rack assemblies are used as position transducers. For example, the rack is fixed to the machine in a position parallel to the movement of the carriage, and meshing with the rack is a pinion pertaining to the carriage. As the carriage moves, the pinion rotates by an angle which is proportional to the displacement of the carriage. The resolution, and conseqently also the precision, obtained with this type of transducer is of about 1/100 of a millimeter. If it is desired to have a better resolution, in the order of one micron, transducers are utilized which are formed by an optical photoengraved rule and a photoelectric reader element. Said rule is a bar isostatically fixed to the structure of the machine in order that it will not be exposed to deformation, and having thin parallel equispaced traces formed thereon by means of photoengraving process. Said rules are of various lengths, but usually they are not constructed for lengths more than 3 meters, because greater lengths would involve problems of difficult thermal stabilization during the photoengraving process, as well as not negligible problems of transportation.

If the element on which the carriage slides is very long, for example five or more meters, it is impossible to use photoengraved rules and it is necessary to have recourse to the pinion/rack coupling, with consequent reduction of the resolution.

SUMMARY OF THE INVENTION

The object of the present invention is to provide a position transducer for machine tools and measuring machines, comprising photoelectric readers and optical photoengraved rules, which will allow being utilized on carriage sliding elements of any length and at the same time will ensure the best precision peculiar to photoengraved rules of normally length.

According to the invention there is provided a position transducer for machine tools and measuring machines, arranged to measure relative displacements of a first part with respect to a second part, wherein said transducer is obtained by means of the optical coupling of at least two photoelectric readers fixed on said first part and at least two optical photoengraved rules rigidly connected to said second part, and wherein selector means are provided which are arranged to present in output the signals from one of said photoelectric readers.

BRIEF DESCRIPTION OF THE DRAWINGS

For a better understanding of the invention a particular embodiment thereof will now be described by way of example with reference to the accompanying drawings, in which.

DETAILED DESCRIPTION OF THE INVENTION

Figure 1:
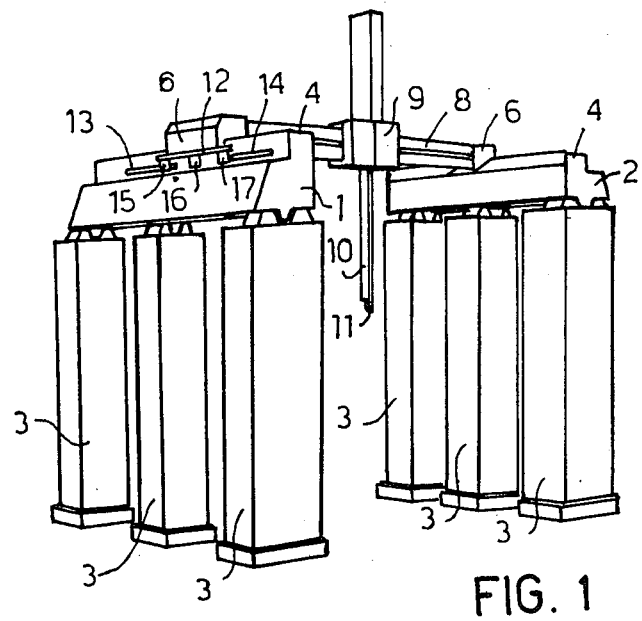
FIG. 1 is a perspective view of a measuring machine having mounted thereon the position transducer of the present invention.
Figure 2:
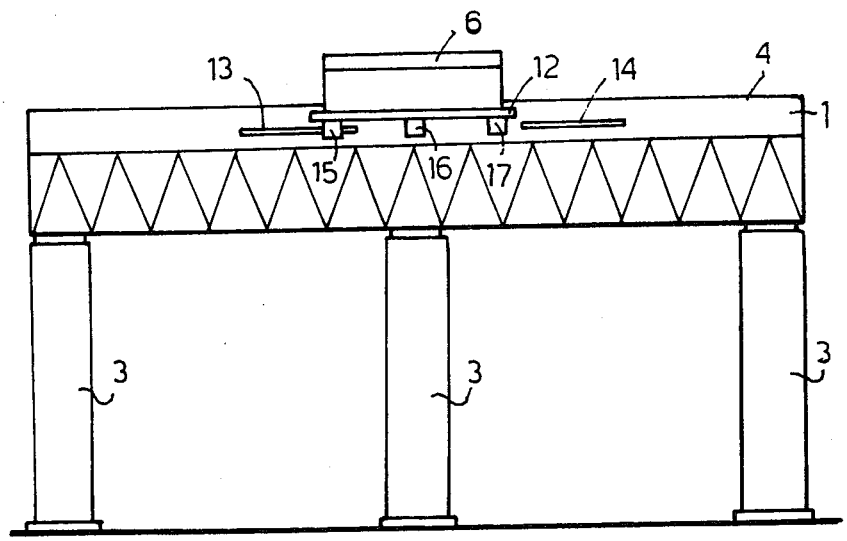
FIG. 2 is a side elevational view of the machine shown in FIG. 1.

FIGS. 1 and 2 show a measuring machine whose bridge crane-shaped structure comprises two horizontal beams 1 and 2 each of which rests on three vertical pillars 3. Disposed on the upper portion of the beams 1 and 2 are rails 4 on which two carriages 6 of a bridge 8 are slidably mounted, said bridge 8 being therefore able to move horizontally along the direction of the beams 1 and 2. Along the bridge 8, namely along the direction orthogonal to the beams 1 and 2, may slide a carriage 9 having a vertically slidable column 10 mounted thereon, at the lower of which there is connected a measuring tool 11.

In a known type of such measuring machine, to which reference is made herein, the beams 1 and 2 have lengths such as to allow a working stroke of six meters for the carriages 6.

Fixed on one of the rails 4 are two photoengraved rules 13 and 14 of known construction, each having a length of slightly more than 1 meter (for example, 1.1m), disposed on straight line parallel to the rails 4, at a distance of substantially 2 meters from each other and 1 meter from the center of the beam 1. On the outer side of the carriage 6 there is fixed a rod 12 which is horizontal and parallel to the rails 4, having a length slightly greater than 2 meters, on which there are fixed, at a distance of 1 meter from one another, three photoelectric readers 15, 16 and 17.

These latter are known elements having two outputs, comprising substantially a sensitive element of the photoelectric type, and are positioned in such a way that said sensitive element, during the travel of the carriage 6, passes in front of the rules 13 and 14.

Figure 3:
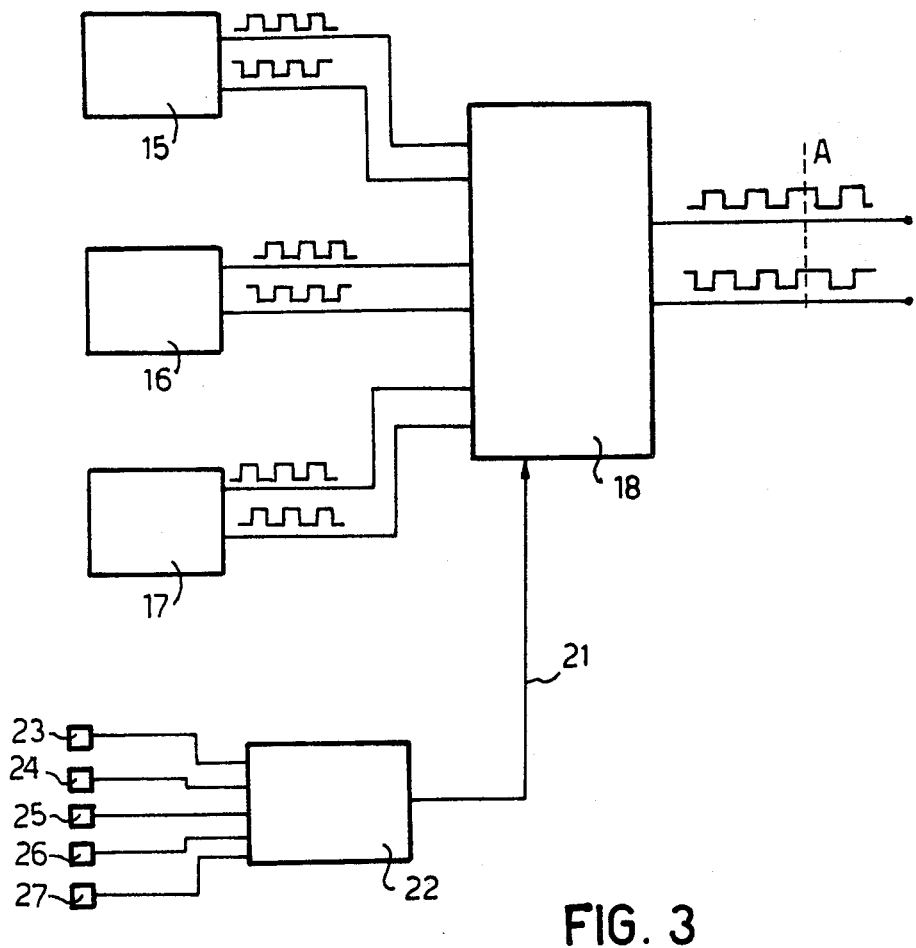
FIG. 3 is a block diagram of the position transducer mounted on the machine of FIG. 1.

FIG. 3 shows a block diagram of the checking circuit of the transducer of the present invention.

The two outputs of the photoelectric readers 15, 16, 17 are connected to the inputs of a selection circuit 18, formed for example by a plurality of logic gates, having connected thereto a connection 21 from the reader checking circuit 22. The inputs of this circuit 22 are connected to five sensors 23, 24, 25, 26 and 27 which may conveniently be formed by means of microswitches actuated by a template of the carriage 6 or by proximity switches actuated by a magnet also fixed to the carriage 6, and are disposed along the rail 4 at a distance of 1 meter from one another. When the bridge 8 is situated at the end of its travel towards the left-hand side, the reader 17 is situated at the left-hand end of the rule 13; if the carriage is moved towards the right-hand side, the reader 17 presents at its outputs two signals, the first of which is formed by a number of rectangular pulses equal to the number of notches on the rule 13 on which it has passed, whilst the second is substantially equal to the first one, but is, with respect to this latter, advanced or delayed by 90 electric degrees, according to the direction of movement of the carriage 6. The two signals of the reader 17 are presented in output by the selection circuit 18 which is connected to a device, known per se and not shown in FIG. 3, for example an electronic processor, which determines and supplies the position of the bridge 8 with a resolution of for example 1 μm.

As the bridge 8 continues moving towards the right-hand side, the reader 17 arrives at the right-hand end of the rule 13 whilst the reader 16 is situated at the beginning of the left-hand end (it is to be noted that the distance between the readers 16 and 17 is 1 meter, whilst the length of the rule 13 is slightly more than 1 meter). At this point the sensor 23 is actuated and sends a pulse such as to signal to the reader checking circuit 22 that the reader 16 has started reading. An instruction sent onto the connection 21 gives rise to a switching in the circuit 18 which presents in output the signal of the reader 16; in this way, the reading is never discontinued, although the optical rule does not extend the whole length of the beam 4. As the bridge 8 continues moving towards the right-hand side, upon instruction from the sensor 24 the reading is effected by the reader 15. Successively, when reader 15 reaches the right-hand end of the rule 13, reader 17 reaches the left-hand end of the rule 14 and the reading is now effected, upon instruction from sensor 25, by the reader 17.

Similarly, by means of the sensors 26 and 27 the output signals from selection circuit 18 will pertain sequentially to the readers 16 and 15, until the end of the stroke at the right-hand side of the carriage is attained. The same sequence as described above will take place, in th inversed order, during the reverse movement of the bridge 8, from the right to the left.

The maximum error which may take place in the passage of the reading between two different readers is of one resolution, i.e. 1 μm; such error, which is only local, give rise to a deformation of the output signal, as can be seen at the moment A of switching-over in FIG. 3, and can be eliminated by adjusting by means of a micrometric screw the distance between the readers. Moreover, such error is not cumulative, since at the passage of the carriage in the reverse direction, owing to the switching position, it acts with opposite sign and equal modulus, so that it annuls itself.

Thus, the position transducer of the present invention as described hereinabove, can be utilized for movable carriage travels of any length, ensuring a resoltuion of 1 μm, by simply varying the length of the photoengraved optical rules and the number of the photoelectric readers. Namely, the number of the photoelectric readers multiplied by the length of an optical rule gives a fictitious length value of the optical rule, determined by the sequential passage of the various readers. Therefore, by dividing the total stroke of the carriage by such fictitious length value we obtain the total number of optical rules which are necessary. Thus, the distance between the opposed ends of said rules must be equal to/or slightly smaller than the distance between the photoelectric end readers, which readers have to be disposed with respect to each other at a distance equal to the length of the optical rule. Conveniently such values are determined by assuming the length of the photoengraved optical rule to be equal to 1 m, which is a value for which such rule can be manufactured with a high precision. The economical advantage obtained by reducing the length of the rules, owing to the increased number of photoelectric readers, is quite substantial; in fact, the cost of one meter of rule is substantially equal to the cost of three readers. In a machine of the type described hereinabove, the cost of the transducer may be reduced substantially to a half of the cost of that of a known type having one reader only. There is, moreover, a limit to the economical convenience of increasing the number of the readers; in fact, from a certain number upwards any further increase does not allow but small reductions of the length of the photoengraved rules. Taking into consideration that a high number of readers involves a greater complexity of the assembly operations and a higher cost of the selection circuit, the optimization of the cost in the case of embodiment shown is conveniently obtained with three photoelectric readers and two photoengraved rules each having a length of about 1 meter, for a working stroke of the carriage of 6 meters. The position transducer of the present invention, which has been described herein in its application for measuring displacements along the greater axis of the machine, is suitable as well for measuring displacements along the two axes orthogonal to the transducer or for effecting measurements along circular surfaces.

Obviously, the position transducer of the present invention is susceptible of modifications and variations which do not depart from the inventive idea contained in it. For example, the sensors may be substituted by notches photoengraved on the optical rules, which notches are detected by the readers passing in front of them and are suitable signalled to the reader checking circuit 22; there may be for example two reference notches, one for each end of the rule and spaced 1 meter from one another. In this case, the signal which indicates that a reference notch has been encountered is obtained simultaneously on two readers, one of which is the one whose output, at that point, is present at the output of the circuit 18; at this point, by means of the circuit 22, a switching takes place in the circuit 18, which switching produces the output of the signal which arrives from the other reader.

What we claim is:

1. Position transducer for machine tools and measuring machines, arranged to measure relative displacements of a first part with respect to a second part, wherein said transducer is obtained by means of the optical coupling of at least two photoelectric readers fixed on said first part and at least two optical photoengraved rules rigidly connected to said second part, and wherein selection means are provided which are arranged to present in output the signals from one of said photoelectric readers.

2. The position transducer of claim 1, wherein said photoelectric readers are equispaced from each other at a distance which is slightly smaller than the length of one of said optical rules.

3. The position transducer of claim 2, wherein the facing ends of said optical rules are disposed at a distance which is equal to or slightly smaller than the distance between the end photoelectric readers.

4. The position transducer of claim 3, wherein the maximum measurable relative displacement between said two parts is given by $L_o \times n_L \times n_F$, where $L_o$ is the length of said optical photoengraved rules, $n_L$ is equal to the number of said optical rules, and $n_F$ is equal to the number of said photoelectric readers.

5. The position transducer of claim 1, wherein the length of one of said optical photoengraved rules is slightly more than one meter.

6. The position transducer of claim 1, wherein said first part is a movable carriage of said machine, while said second part belongs to a fixed structure of said machine.

7. The position transducer of claim 1, wherein said selection means comprise a selection circuit and control means for said circuit, for presenting in output the signals coming from one of said readers.

8. The position transducer of claim 7, wherein said control means comprise a plurality of sensors, the number of which is equal to the total number of photoelectric readers multiplied by the total number of the optical photoengraved rules and reduced by one unit, and which are arranged to activate themselves when said readers have substantially reached one end of said rules.

9. The position transducer of claim 8, wherein said sensors comprise proximity switches disposed on said fixed part and activated by templates belonging to said movable part.

10. The position transducer of claim 8, wherein said sensors comprise proximity switches disposed on said fixed part and activated by magnets rigidly connected to said movable part.

11. The position transducer of claim 7, wherein said control means comprise reference notches photoengraved on said optical rules and detectable by said photoelectric readers.

* * * * *